United States Patent [19]

Dorgathen

[11] 4,261,826

[45] Apr. 14, 1981

[54] MAGNET CLEANING DEVICE

[75] Inventor: Friedrich Dorgathen, Hösel, Fed. Rep. of Germany

[73] Assignee: Montanus Industrieanlagen GmbH, Essen, Fed. Rep. of Germany

[21] Appl. No.: 131,885

[22] Filed: Mar. 20, 1980

[51] Int. Cl.³ .............................................. B01D 35/06

[52] U.S. Cl. .................................... 210/222; 210/396; 210/400; 210/526

[58] Field of Search ............... 210/222, 396, 400, 526, 210/223, 106, 107, 251; 209/218, 228, 229, 230

[56] References Cited

U.S. PATENT DOCUMENTS

| | | | |
|---|---|---|---|
| 1,188,340 | 6/1916 | Tark | 210/161 |
| 2,471,044 | 5/1949 | Scrivener | 210/222 |
| 2,759,606 | 8/1956 | Nippert | 210/222 |
| 2,822,089 | 2/1958 | Wordruff | 210/222 X |
| 3,357,559 | 12/1967 | Israelson | 210/223 |
| 3,537,586 | 11/1970 | Huntteler | 210/222 |
| 3,712,472 | 1/1973 | Elliott | 210/222 |
| 3,848,743 | 11/1974 | Danberg | 209/218 |
| 4,031,011 | 6/1977 | Dorgathen | 210/222 |
| 4,209,403 | 6/1980 | Dorgathen | 210/222 |

*Primary Examiner*—Theodore A. Granger
*Attorney, Agent, or Firm*—John J. Dennemeyer

[57] ABSTRACT

Magnetic filter apparatus with a plurality of magnetic bars, carried on endless conveyor chains through a container for contaminated liquid, having for the cleaning of said magnetic bars a device which is positioned outside the liquid above the fluid container. The cleaning device has at least two chain-driven dirt scrapers with wiping formations which enclose from above and below one or more magnetic bars during the cleaning process. In order that the dirt removed during the scraping operation should not fall onto the driving chains, the chain drive is positioned above and to the side of the liquid container. The chain drive moves a steered carriage which bears scraping rods which can be opened and closed pincer-fashion. The dirt scrapers are positioned on the front ends of these rods which project over the container area. The cleaning process takes place with pincers closed, the return stroke with pincers open.

6 Claims, 3 Drawing Figures

MAGNET CLEANING DEVICE

This invention relates to a magnet cleaning device for magnetic filter apparatus of the kind in which an endless wall of magnetic filter bars is carried by parallel conveyor chains or the like through a liquid container which receives contaminated liquid which is to be cleaned.

In previously proposed apparatus of this kind, the filter bars are conveyed through the liquid and then past a cleaning device above the level of the liquid. The cleaning device comprises at least two movably driven dirt scrapers which at any one time during the cleaning operation enclose one or more magnetic bars from above and from below with wiping blades and carry out a rectilinear wiping movement of the magnetic bars.

In the magnetic filter system proposed in German Offenlegungsschrift No. 2 429 849 the device for cleaning the magnetic bars is situated above the level of the liquid on the liquid container and comprises endless circulating chains arranged above and below the magnetic bars and carrying dirt scrapers which encompass the magnetic bars and free them of the adhering dirt with a straight lengthwise scraping movement.

A disadvantage of this arrangement which has now come to light is that the chains running below the magnetic bars are affected by the stripped-off particles of dirt falling down into the dirt disposal unit, since the falling dirt gets into not only the disposal unit provided, but also gradually leads to elongation of the chains and increased wear and tear.

An object of the invention is to avoid the aforementioned disadvantages and, more particularly, to free the space between the dirt disposal unit and the magnetic bars completely from any fixed machine equipment necessary for the cleaning of the magnetic bars, as for example, endlessly circulating chains, so that the dirt removed can fall unhindered into the dirt disposal unit.

According to the present invention there is provided in magnetic filter apparatus of the kind including a plurality of parallel magnetic bars forming an endless wall partially immersible in a liquid container, a cleaning device for cleaning the bars in a region above said container, said device comprising a carriage reciprocal on a rectilinear path outside said region, at least two elongate scraping elements mounted on said carriage for pivotal movement together and apart and extending into said region respectively above and below said wall of magnetic bars, and wiping formations on said scraping elements for engaging the magnetic bars during a cleaning stroke of the carriage.

These elements are provided at their foremost ends with dirt scrapers which encompass the magnetic bars that are to be cleaned between them. The elements reach from the non-magnetic front end to the non-magnetic rear end of the magnetic bars. The whole mechanism for the cleaning of the magnetic bars is thereby located outside the area of falling dirt so that the stripped-off particles of dirt can fall into a dirt disposal unit without hindrance and without the build-up of deposits. Also, when the pincer-like scraping rods encompass the magnetic bars with their dirt scrapers, and movement of the carriage causes them to sweep in a straight wiping motion the entire length of the magnetic bars, the lower scraping rod does not come into contact with the falling dirt, since the scraping process begins at the front end of the magnetic bars and the scrapers during the scraping motion strip off the dirt in advance, so to speak. Of course on the return stroke too the lower scraping rod is located below the magnetic bars. However, no more dirt falls since the rods are open and the scrapers are consequently no longer in contact with the magnetic bars. But even with the scraping process operating in reverse the danger of excessive soiling of the lower scraping rod would be minimal, since it presents only a relatively small surface area to the falling dirt particles. A breakdown of the operational sequence would be unlikely, even if the rods should become extremely soiled, since they—because of their exclusive function as carriers for the dirt scrapers—are robustly constructed and have no parts subject to wear.

A preferable arrangement of the invention has the carriage guided in a cantilevered housing which can be flange mounted on the container, the carriage further being movable on rollers. The console is flange mounted on the side of the liquid container so that the carriage and the carriage drive are arranged aside from the operation area of the actual filter unit, which allows unhindered access to the container for the carrying out of necessary maintenance work. If a cantilevered housing cannot be fitted for reasons of space, it is of course possible to mount the carriage guide and drive mechanism above the magnetic bars, whereby here too the scraping rods are arranged to the side projecting over the liquid container area.

The invention will now be further described by way of example only, with reference to the accompanying drawings, in which.

Figure 1:
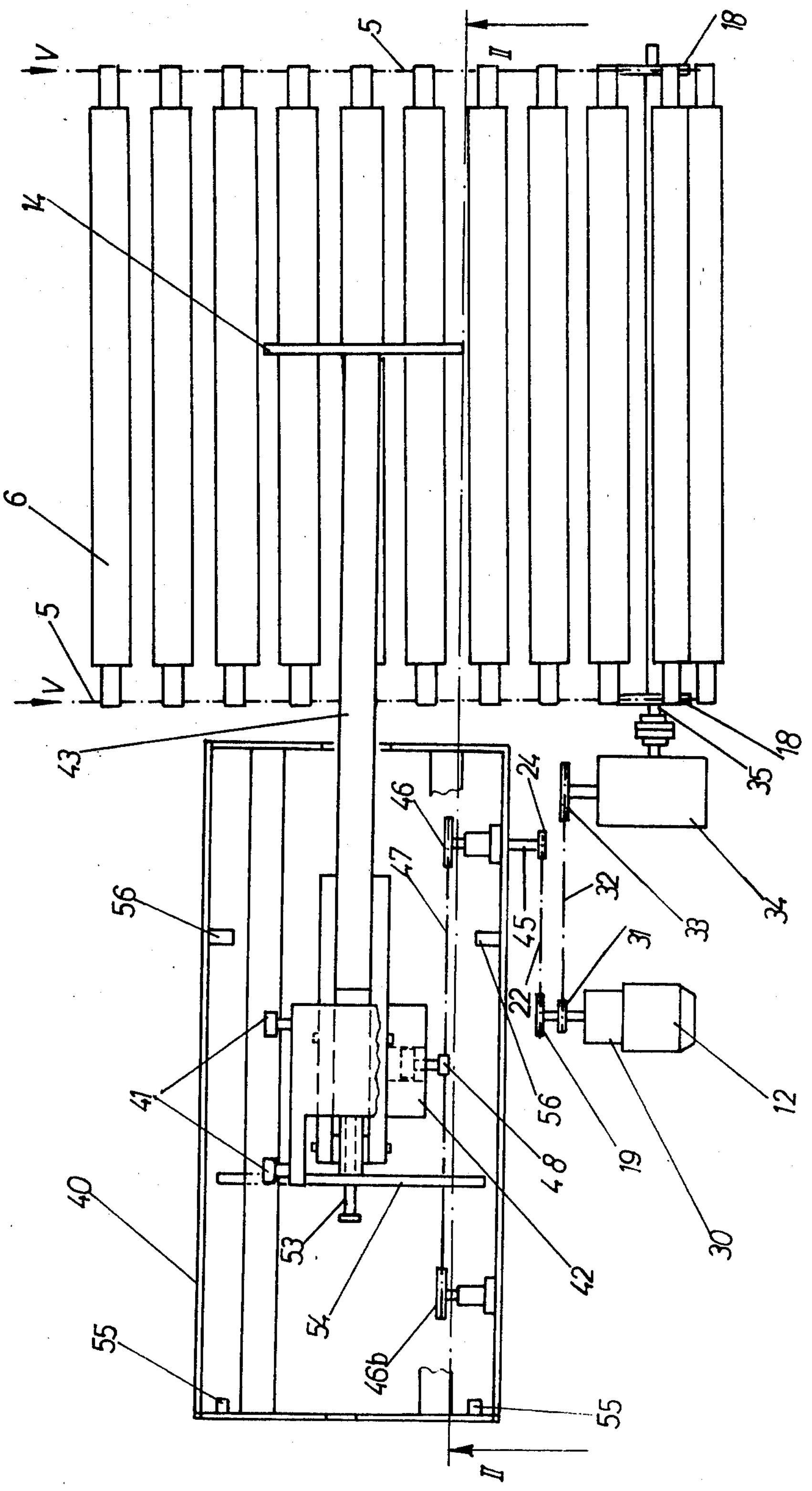
FIG. 1 is a partly broken away plan view of one embodiment of magnet cleaning device according to the invention in association with magnetic filter apparatus.

Referring to FIG. 1 a wall of magnetic filter bars 6 is guided horizontally in the direction of arrow V by endless main conveyor chains 5 and then downwards by chain wheels 18 for immersion in a liquid bath (not shown). A housing 40 is flange mounted in cantilever fashion on liquid container 1 at a side axially spaced from the magnetic bars 6. The housing 40 contains a carriage 42 movable on rollers 41. The carriage 42 bears upper and lower, pincer-like, openable and closable scraping rods 43, 44 which can be pivoted about axes P1, P2. The scraping rods 43, 44 project into the region of the container 1 and each have on their front ends respective dirt scrapers 14 each of which is provided with three semicircular recesses for simultaneously wiping three magnetic bars 6, as described in German Offenlegungsschrift No. 2 429 849.

A common motor 12 effects movement of the carriage 42 as well as driving the main conveyor chains 5 and the dirt removal equipment 16—this latter being a vibrating chute or belt conveyor. The applicant has previously proposed such a common drive mechanism (of. German Offenlegungsschrift No. 27 10 005). In conjunction with the drive motor 12 there is also an infinitely variable ratio gear 30, whose motor-driven main drive shaft 29 has two chain wheels 19, 31. The chain wheel 31 drives a mitre wheel gear transmission 34 with set reduction gear ratios via a driving link-chain 32 and a chain wheel 33. The gear transmission 34 drives the sprocket shaft 35 bearing the guide wheels 18 and with it the main conveyor chains 5. The other chain wheel 19—via a chain 22 and a chain wheel 24 fixedly mounted outside the cantilever housing 40 on a shaft 45 extending into the housing 40 and then via a further chain wheel 46 fixed to the shaft 45 inside the housing 40—drives at least one chain 47 which rotates endlessly around the chain wheels **46, 46*b* in the housing 40. The chain 47 has a driving pin 48 which—when two parallel-running chains 47 are used—is fixed between both chains and fits into a fork 49 on the carriage. The carriage can thus be reciprocated between end positions E1, E2, the spacing of which is determined by the length of the chain 47**.

Figure 2:
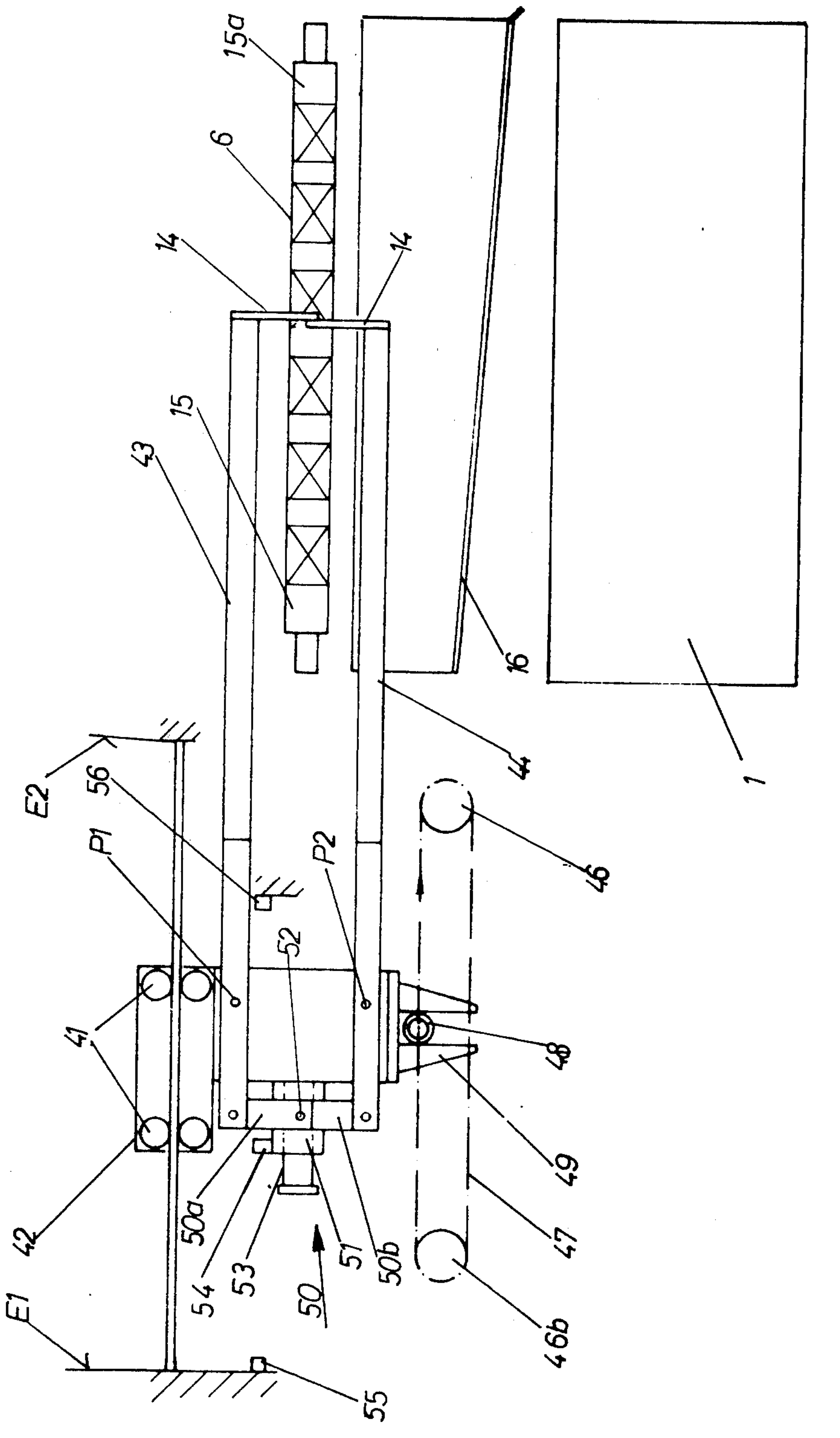
FIG. 2 is a section on line II—II of FIG. 1 during the scraping stroke of the device with the scraping rods closed.
Figure 3:
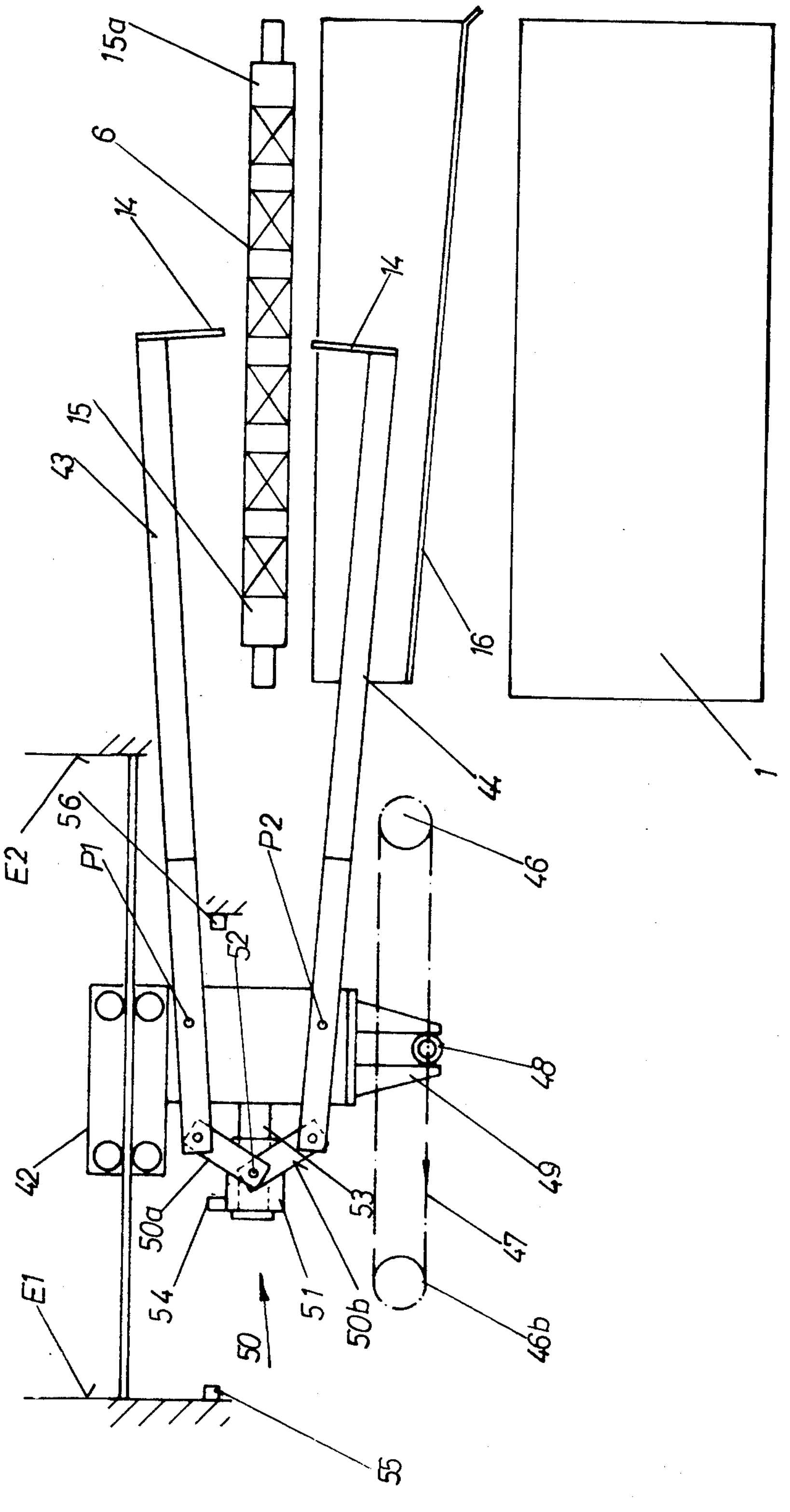
FIG. 3 is a view corresponding to FIG. 2 during the return stroke with the scraping rods open.

To enable opening and closing of the scraping rods 43, 44, pincer-fashion, these are interconnected at one end by a toggle lever 50. The toggle lever 50 is formed by two links **50*a*, 50*b*, of which one is pivoted to the upper and one to the lower scraping rod 43, 44 and which have a joint pivot point 52, constructed as a bearing 51. The bearing 51 is mounted on a slide 53 and a stop 54 is fixedly mounted thereon. Further stops 55, 56 are fitted at fixed points within the range of travel of the carriage 42. These stops either open (FIG. 3) or close (FIG. 2) the pincers when in contact with stop 54, in that the links 50*a*, 50*b* by adjustment on the slide 53** in the one case adopt an angular position to one another and in the other case are vertically aligned one above the other.

The method of operation of the cleaning device is as follows:

During operation of the magnetic filter apparatus the endless chain 47, driven by the common driving motor 12, circulates continuously. As the driving pin 48 carried by the chain 47 engages in a fork 49 on the carriage 42, the carriage 42 is moved rectilinearly from one end position E1 to the other E2. Before the carriage reaches the rear limit E1 the stop 54 comes into contact with the stop 55, so that during the rest of the stroke back to position E1 (at which point the direction of movement of the carriage is reversed) the links **50*a*, 50*b* of the toggle lever with their joint pivot point 51 are pushed along the slide 53 against the direction of movement of the carriage 42 and the circulating chain 47 into a position where the links 50*a*, 50*b* are vertically in line one above the other. The scraping rods 43, 44 are thereby turned around the pivot points P1, P2 until they are in horizontal parallel relationship to one another, which is achieved when the carriage 42 has reached the end position E1. The scraping rods 43, 44 are now closed and compass the soiled magnetic bars 6 from above and below with the dirt scrapers 14, projecting in this position so far into the area of the liquid container 1 that the magnetic bars 6 are clasped at their non-magnetic front ends 15. For the maintenance of a fully continuous operation the dirt scrapers 14** here are again slightly off-set—as described in commonly owned German Offenlegungsschrift No. 27 10 005.

As soon as the carriage 42 sets off from this position in the other direction, the dirt scrapers 14 wipe lengthwise over the magnetic bars 6 and strip off the adhering dirt, which then falls into the dirt disposal unit 16. Before the carriage has completed its stripping stroke and reached the front end position E2, the stop 54 comes into contact with the stop 56, whereby the links of the toggle lever 50 are placed at an angle to one another, thereby raising the scraping rods 43, 44 from the magnetic bars 6.

During the operational stroke the rods 43, 44 scrape with the dirt scrapers 14 the entire magnetic part of the bars 6 and in the end position E2 (from which point the carriage again reverse direction) the rods lift off on having reached the non-magnetic rear ends **15*a* of the magnetic bars 6**.

What is claimed is:

1. In magnetic filter apparatus of the kind including a plurality of parallel magnetic bars forming an endless wall partially immersible in a liquid container, a cleaning device for cleaning the bars in a region above said container, said device comprising a carriage reciprocal on a rectilinear path outside said region, at least two elongate scraping elements mounted on said carriage for pivotal movement together and apart and extending into said region respectively above and below said wall of magnetic bars, and wiping formations on said scraping elements for engaging the magnetic bars during a cleaning stroke of the carriage.

2. A device as claimed in claim 1, further comprising a carriage housing flange mounted in cantilever fashion on the liquid container to one side of said region.

3. A device as claimed in claim 2, wherein the carriage is mounted on rollers in said housing.

4. A device as claimed in claim 1, wherein a toggle lever comprising two links interconnects the two pivotal scraping elements and a common pivot point of the two links comprises an adjustable mounting on a slide.

5. A device as claimed in claim 1, wherein a driving pin is fixed to an endlessly circulating chain and fits into a fork on the carriage.

6. A device as claimed in claim 4, wherein stops are positioned at fixed points within the range of travel of the carriage for contacting a stop fixed on the common pivot of the toggle lever.

* * * * *